Patented Feb. 5, 1952

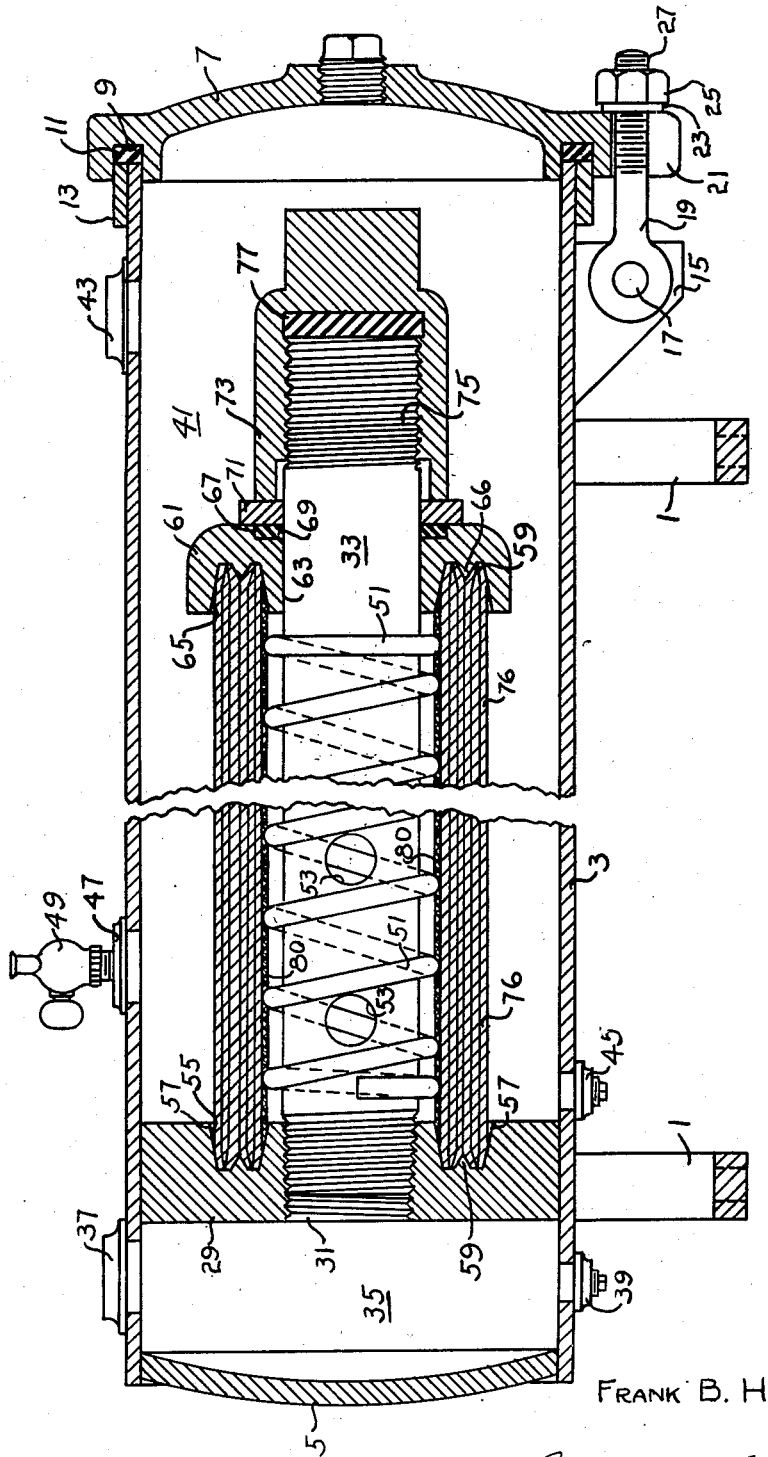

2,584,387

UNITED STATES PATENT OFFICE 2,584,387

EXPENDIBLE CARTRIDGE FILTER AND METHOD OF MAKING SAME

Frank B. Harvuot, Fort Wayne, Ind., assignor to Bowser, Inc., Fort Wayne, Ind., a corporation of Indiana Application November 6, 1944, Serial No. 562,191

3 Claims. (Cl. 210—183)

This invention relates to a filter employing a cartridge type filtering element which is adapted to be withdrawn and discarded when it becomes plugged with foreign matter. More especially, it relates to such an expendable cartridge made from paper which has been treated with a phenolic formaldehyde resin and wound into a cylinder comprising a number of layers. The object of the invention is to provide a filter cartridge which is inexpensive and can be discarded when it is plugged by foreign matter removed by it.

Another object of the invention is to provide a cartridge type filter which has considerable strength and rigidity.

Still another object of the invention is to provide a paper filter cartridge which will not become soggy when subjected to water, gasolines, oils, and other liquids.

Still another object of the invention is to provide a filter which is adapted to receive and hold a paper filter cartridge and which will prevent leakage of liquid to be filtered, around the ends of such cartridge.

Still another object of the invention is to provide an impregnated paper filter cartridge.

It is another object of the invention to provide a method of making a cartridge from phenolic formaldehyde resin-impregnated paper.

These and other objects will become apparent from a study of this specification and the drawing which is attached thereto and made a part thereof and in which the single figure is a vertical sectional view showing the filter, the filtering cartridge and the means for supporting and holding said cartridge.

Referring now to the drawing, the numeral 1 represents a pair of supports which are attached to a horizontally disposed filter tank 3 which is provided at one end with a permanent head 5 and at the other with a removable cap 7. The cap is provided with a groove 9 which receives a resilient gasket 11 which is drawn into sealing relation with the end of the filter tank 3 and its reinforcing band 13. A plurality of pairs of lugs 15 are fixed to the exterior of the tank 3 and pivot pins 17 pass through holes in the ears and support the eye bolts 19 which are received in clevises or bifurcated lugs 21 which are formed integrally with the cap. A washer 23 and a nut 25 are mounted on the threaded end 27 of the eye bolt and serve to hold the cap and the gasket 11 against the end of the tank and the ring 13.

Welded in the end of the tank adjacent, but spaced from the head 5, is a bulkhead 29 which is perforated at 31 and provided with an internal pipe thread. A pipe 33 threadedly engages said perforation and opens into the compartment 35 formed between the parts 5 and 29. An outlet flange 37 and a normally plugged drain flange 39 are fixed on the tank 3 and communicate with the compartment 35. The compartment 41 formed between the element 29 and the cap 7 has an inlet flange 43, a normally plugged drain flange 45 and a vent flange 47 in which is mounted a vent cock 49. All of the flanges communicate with the compartment 41. A wire 51 is wound about and fixed to the exterior of the pipe 33 in an extended helix, and the pipe is provided with perforations 53.

The bulkhead 29 is provided with a groove 55 which is circular and is concentric with the pipe 33. The side walls 57 of the groove taper inwardly and the V-shaped or sharp ring 59 is formed at the bottom of said groove, intermediate the side walls.

A seal ring 61 is centrally perforated as at 63 to slip over the outside of the pipe 33. This ring is provided with a groove 65 and a ring 66, which are similar to the groove 55 and the ring 59 in the bulkhead. A recess 67 is provided on the face of the ring 61 opposite groove 65 and this receives a resilient gasket 69. A washer 71 overlies the gasket and a closed end or acorn-type nut 73 threadedly engages the screw thread 75 formed on the outer end of the pipe 33. A gasket 77 of resilient material fits inside the nut 73 and engages the end of the pipe 33 so as to close the same. Compressed in the grooves 55 and 65 is the filter cartridge 76. The inclined side walls of the grooves 55 and 65 compresses the ends of the filter cartridge 76 as the nut 73 is screwed onto the pipe 33 and the V-shaped rings 59 and 66 impale the ends of the cartridge to insure that the cartridge is sealed at each end so as to prevent by-passing of unfiltered liquid around the ends of the cartridge.

The cartridge is made from a sheet of laminated cellulose preferably sulphite pulp paper. The sheet may be made of from five to twelve separate laminations. Each lamination is approximately .0025 inch thick. The laminations are also slightly creped. The cellulose sheets are formed by placing together the required number of laminations and then rolling the sheet into a common roll, which may be three or four feet in diameter and three to five feet in length. This roll is known as the parent roll.

The parent roll is then placed on a spindle and is unwound mechanically. The laminated sheet leaving the roll is passed through a vat of phenolic formaldehyde resin which has been heated to a temperature of approximately 120 degrees Fahrenheit. The speed of passage of the sheet is low enough to permit complete penetration of the sheet by the resin. In its original state it is water-soluble but after heating to elevated temperature it loses its water solubility and when completely cured or polymerized, it is essentially water and solvent insoluble.

As the sheet leaves the resin bath, it is passed between a pair of squeeze rolls which squeeze out all of the excess resin. Thereafter, a blast of warm air is applied to both sides of the sheet to dry it until it is barely tacky. The sheets are thereupon rolled onto a roll similar to the parent roll.

Thereafter the impregnated sheet is cut to the length required for the cartridge and rerolled on a mandrel which has a diameter equivalent to the inside diameter required for the filter cartridge. A slight amount of water is added to the sheet as it is wound on the mandrel. This can be done by spraying or by means of a water-fed roll. The sheet is then wound on the mandrel until the desired outside diameter is attained. Just before the sheet is cut off, additional water must be added to the loose end to provide a sticky strip which is then wound onto and stuck down on the cylinder to form a joint. The mandrel and filter cylinder are removed from the winding machine and placed in an oven and baked at a temperature of about 250 degrees Fahrenheit from four to six hours. The baking (polymerization) loosens the cylinder from the mandrel so that it can be withdrawn and also renders the resin which has been heretofore soluble in water, insoluble in water, petroleum products and many other liquids.

The cylinders are preferably wound slightly longer than the final filter cartridge so that the ends may be accurately trimmed and squared.

The porosity or density of the filtering cartridge may be controlled by any one or all of the three following methods.

1. Control of the tension of the sheet as it is wound upon the mandrel provides control of porosity. The greater the tension, the less porosity attained in the cartridge, and the less the tension, the greater the porosity.

2. An idler roll may be disposed above the mandrel so as to ride upon the cartridge as it receives the sheet. The pressure of the idler on the mandrel roll may be changed. A dense filter cartridge is secured by applying greater pressure to the mandrel roll and the less dense cartridge is secured by applying less pressure.

3. The viscosity of the phenolic formaldehyde resin may be varied in the original impregnation of the cellulose. When a more viscous resin is used, the porosity of the filter cartridge will be reduced and if the viscosity is decreased, the porosity will be increased.

Cartridges such as those described above have been made and tested on gasoline, oil, water, salt brine, turpentine, vinegar, apple cider, beer, whiskey, wine, paint thinner, light varnish, and other liquids. In one form this cartridge was about 15 inches long, about 2⅛ inches in outside diameter and 1⅜ inches in inside diameter, yielding a wall thickness of about ⅜ of an inch. This cartridge has been found to be very efficient in its operation and to have the strength required under normal filtering pressures of from two to forty pounds per square inch.

It has been found that the cartridge after baking, is somewhat brittle and when it is forced over the wire helix 51, the cartridge may become bruised. The broken fibers are washed away when filtering begins and may be objectionable in the filtrate. Applicant may, in such cases impregnate a loosely woven cloth, 80, such as cheesecloth, with the resin and wrap a few layers of the cloth on the mandrel before applying the paper thereto. Preferably the leading edge of the paper would be united with the cloth by moistening the paper, cloth or both. The layer of cloth would serve as a cushion for the paper as the cartridge is installed over the helix.

Operation

In operation, a pipe through which unfiltered liquid is supplied is connected with a flange 43 of chamber 41, and the filtrate outlet pipe is connected with the flange 37 of the chamber 35. The vent cook 49 is then opened and the chamber 41 is filled with liquid to be filtered. When all air has escaped from the filtering chamber 41, vent cock 49 is closed and liquid pressure builds up in chamber 41. The liquid is forced through the filter cartridge 76, through the holes 53 in pipe 33 and it then flows into discharge chamber 39 and out through the boss 37 and the discharge pipe. The wire 51 serves to support the interior of the filtering cartridge 76 against the pressure of liquid which is applied externally to the cartridge. The foreign matter in the liquid is removed by the cartridge, and when the differential pressure between the inlet and outlet builds up and the flow rate of filtrate decreases beyond reasonable limits, the liquid inlet and discharge lines are closed, the vent cock 49 is opened, the drain plugs 39 and 45 are removed to drain the chambers 41 and 35, and thereafter the nuts 24 are loosened on eye bolts 19, which are then swung out of the bifurcations 21 and the cap 7 is removed. The nut 73 is unscrewed from the end of the pipe, washer 71 and seal ring 61 are removed from the pipe. The filter cartridge 76 may then be slid from its place on the wire helix 51 and replaced by a fresh cartridge. The parts 61, 71 and 73 are then replaced and the nut 73 is drawn down, the cap 7 and plugs 39 and 45 are replaced and the filter is again ready for filtering operation.

It is obvious that various changes may be made in the form, structure and arrangement of parts without departing from the spirit of the invention. Accordingly, applicant does not desire to be limited to the specific embodiment disclosed herein primarily for purposes of illustration; but instead, he desires protection falling fairly within the scope of the appended claims.

What I claim to be new and desire to protect by Letters Patent of the United States is:

1. In a filter, the combination of a tank having an inlet for liquid to be filtered and a filtrate outlet, a filter element, comprising a plurality of laminations of phenol formaldehyde resin-impregnated paper bonded together to form a unitary structure, disposed between said inlet and outlet, said element being in the form of a tube disposed in said tank, means for closing the ends of said tube each comprising an element having a tapering groove adapted to receive the end of the tube and to compress it, and a sharpened ring disposed at the bottom of the groove for impaling the end of the tube.

2. The method of forming a filter element comprising the steps of impregnating a sheet of porous paper with a water soluble, phenolic formaldehyde resin, removing excess resin, reducing said sheet to a substantially uniform thickness, moistening at least one surface of the sheet with water, assembling a plurality of layers of said sheets in face to face relation normal to the direction of filtration, applying pressure thereto and thereafter polymerizing the resin.

3. The method of forming a filter element comprising the steps of impregnating a sheet of porous paper with phenolic formaldehyde resin, expelling excess resin to maintain the sheet porous, drying said impregnated sheet, forming a filter element therefrom, by remoistening at least one surface of the sheet to soften the resin, compressing the sheet in layers transversely to the direction of filtration, and thereafter polymerizing said resin.

FRANK B. HARVUOT.

REFERENCES CITED

The following references are of record in the file of this patent:

UNITED STATES PATENTS

| Number | Name | Date |
|---|---|---|
| 927,606 | Sellenscheidt | July 13, 1909 |
| 1,019,406 | Baekeland | Mar. 5, 1912 |
| 1,284,297 | Frederick | Nov. 12, 1918 |
| 1,352,436 | Dickey | Sept. 14, 1920 |
| 1,710,758 | Wright | Apr. 30, 1929 |
| 1,720,670 | Duclaux | July 16, 1929 |
| 1,812,927 | Bull et al. | July 7, 1931 |
| 2,001,031 | Landt | May 14, 1935 |
| 2,103,572 | Wells | Dec. 28, 1937 |
| 2,196,821 | Arnold | Apr. 9, 1940 |
| 2,210,397 | Dreiss | Aug. 6, 1940 |
| 2,278,603 | Williams | Apr. 7, 1942 |
| 2,354,556 | Stahl | July 25, 1944 |
| 2,365,766 | Levier | Dec. 26, 1944 |
| 2,375,246 | Kasten | May 8, 1945 |
| 2,376,213 | Watson et al. | May 15, 1945 |
| 2,380,111 | Kasten | July 10, 1945 |
| 2,386,684 | Hermanson | Oct. 9, 1945 |